(12) United States Patent
Tsai

(10) Patent No.: US 8,544,777 B2
(45) Date of Patent: Oct. 1, 2013

(54) RECYCLING MACHINE FOR PROCESSING REUSED MATERIALS

(75) Inventor: Chun-Yu Tsai, Taichung (TW)

(73) Assignee: Kun Sheng Machines Co., Ltd., Taichung (TW)

( * ) Notice: Subject to any disclaimer, the term of this patent is extended or adjusted under 35 U.S.C. 154(b) by 219 days.

(21) Appl. No.: 13/093,009

(22) Filed: Apr. 25, 2011

(65) Prior Publication Data

US 2012/0267460 A1 Oct. 25, 2012

(51) Int. Cl.
*A47J 17/14* (2006.01)
*B02C 9/04* (2006.01)
*B02C 19/22* (2006.01)

(52) U.S. Cl.
USPC ............ 241/82.5; 241/74; 241/81; 241/260.1

(58) Field of Classification Search
USPC .......................... 241/82.1, 82.5, 74, 81, 260.1
See application file for complete search history.

(56) References Cited

U.S. PATENT DOCUMENTS

| | | | | |
|---|---|---|---|---|
| 4,181,265 A | * | 1/1980 | Young et al. ............... | 241/257.1 |
| 4,730,790 A | * | 3/1988 | Williams ...................... | 241/81 |
| 4,908,101 A | * | 3/1990 | Frisk et al. .................. | 162/261 |
| 5,429,183 A | * | 7/1995 | Hisamori et al. .......... | 165/134.1 |
| 5,443,214 A | * | 8/1995 | Lesar .......................... | 241/82.2 |
| 2002/0125352 A1 | * | 9/2002 | Ivanov et al. ............... | 241/23 |

FOREIGN PATENT DOCUMENTS

| TW | 087206389 | * | 1/1999 |
|---|---|---|---|
| TW | M319146 | * | 9/2007 |

* cited by examiner

*Primary Examiner* — Dana Ross
*Assistant Examiner* — Chwen-Wei Su
(74) *Attorney, Agent, or Firm* — Leong C. Lei

(57) ABSTRACT

A recycling machine includes a main frame, a sieve barrel, a pressing cylinder, an end disk, a propeller shaft, a cutting device and an output device. The sieve barrel has a receiving chamber and a plurality of sieving apertures. The pressing cylinder has a receiving space and a plurality of toothed pressing portions. The end disk has a plurality of extruding holes. The propeller shaft has a first helical blade, a buffering portion and a second helical blade. Thus, the reused materials are forced into and revolved in the sieve barrel by rotation of the first helical blade to proceed a first-stage dehydration process, and are compressed in the buffering space between the buffering portion and the receiving chamber to proceed a second-stage dehydration process so that the reused materials are dehydrated completely.

19 Claims, 10 Drawing Sheets

RECYCLING MACHINE FOR PROCESSING REUSED MATERIALS

BACKGROUND OF THE INVENTION

1. Field of the Invention

The present invention relates to a recycling machine and, more particularly, to a recycling machine for processing wasted and reused materials, such as plastic materials, wooden materials, paper materials and the like.

2. Description of the Related Art

A conventional recycling machine comprises a frame, a sieve barrel mounted on the frame and having an inlet port, a main shaft rotatably mounted in the sieve barrel, and a kneading device mounted on an output terminal of the main shaft. The main shaft has a helical blade. In operation, when the main shaft is rotated, the reused materials from the inlet port into the sieve barrel are revolved by rotation of the helical blade of the main shaft so that the reused materials are dehydrated. Then, the reused materials are extruded outward from the output terminal of the main shaft into the kneading device. Then, the reused materials are rolled and kneaded by the kneading device. Then, the reused materials are delivered outward from the kneading device.

However, when the reused materials are delayed or choked in the kneading device, the reused materials in the sieve barrel are squeezed backward to space from the helical blade of the main shaft so that the reused materials are attached to the inner wall of the sieve barrel, thereby causing difficulty to the dehydration process. In addition, when the reused materials are fully choked or jammed in the sieve barrel, the recycling machine is easily inoperative, and it is necessary to stop operation of the recycling machine and to clear the reused materials the sieve barrel, thereby decreasing the working efficiency of the recycling machine. Further, the reused materials are not kneaded in the kneading device smoothly and evenly, thereby decreasing the quality of the reused materials. Further, when the reused materials are kneaded in the kneading device, the reused materials are easily melted by a greater temperature that is produced due to a high speed friction so that the reused materials are bonded and jammed in the kneading device to make the kneading device inoperative.

BRIEF SUMMARY OF THE INVENTION

In accordance with the present invention, there is provided a recycling machine, comprising a main frame, a sieve barrel mounted on the main frame, a pressing cylinder connected with the sieve barrel, an end disk mounted on the pressing cylinder, a propeller shaft rotatably mounted in the sieve barrel and the pressing cylinder, a cutting device mounted on the end disk, and an output device mounted on the end disk.

The sieve barrel has an inner wall provided with a receiving chamber and has a surface provided with a plurality of sieving apertures each connected to the receiving chamber. The sieve barrel has a periphery provided with an inlet port connected to the receiving chamber. The pressing cylinder has an inner wall provided with a receiving space connected to the receiving chamber of the sieve barrel. The receiving space of the pressing cylinder has a periphery provided with a plurality of toothed pressing portions. The receiving space of the pressing cylinder has a first end connected to the receiving chamber of the sieve barrel and a second end sealed by the end disk. The end disk is provided with a plurality of extruding holes each connected to the receiving space of the pressing cylinder. The propeller shaft is received in the receiving chamber of the sieve barrel and the receiving space of the pressing cylinder. The propeller shaft is provided with a first helical blade disposed in the sieve barrel, and a buffering portion disposed in the sieve barrel, and the recycling machine further comprises a second helical blade mounted on the propeller shaft and disposed in the pressing cylinder. The cutting device is aligned with the extruding holes of the end disk.

According to the primary advantage of the present invention, the reused materials are forced into and revolved in the sieve barrel by rotation of the first helical blade to proceed a first-stage dehydration process, and are compressed in the buffering space between the buffering portion of the propeller shaft and the receiving chamber of the sieve barrel to proceed a second-stage dehydration process so that the reused materials are dehydrated completely.

According to another advantage of the present invention, the travel direction of the reused materials is changed by actions of the spoilers and the second helical blade so that the reused materials will not be choked or jammed during movement.

According to a further advantage of the present invention, when the reused materials are delivered into the pressing cylinder, the reused materials are pressed by the toothed pressing portions and are drawn by the second helical blade so that the reused materials are pressed and kneaded in the pressing cylinder smoothly and evenly to enhance the quality of the reused materials.

According to a further advantage of the present invention, the reused materials are forced into the pressing cylinder by rotation of the second helical blade and are pressed by the toothed pressing portions so that the reused materials are compressed and rolled to have a compact structure.

According to a further advantage of the present invention, the reused materials are cut by the cutting device to have a particle, bar or strip shape with a predetermined length to enhance the working time and efficiency.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
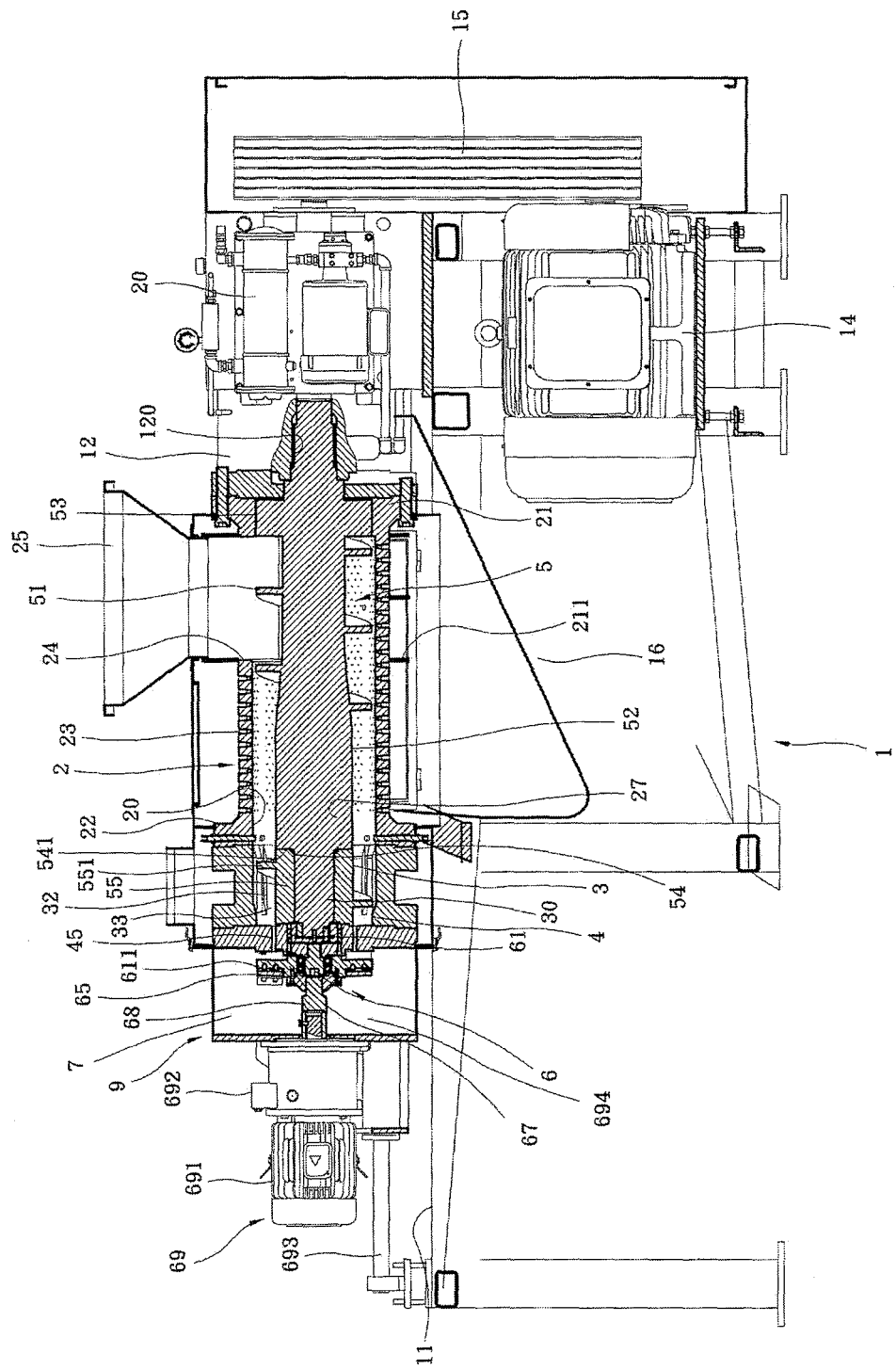
FIG. 1 is a front cross-sectional view of a recycling machine in accordance with the preferred embodiment of the present invention.
Figure 2:
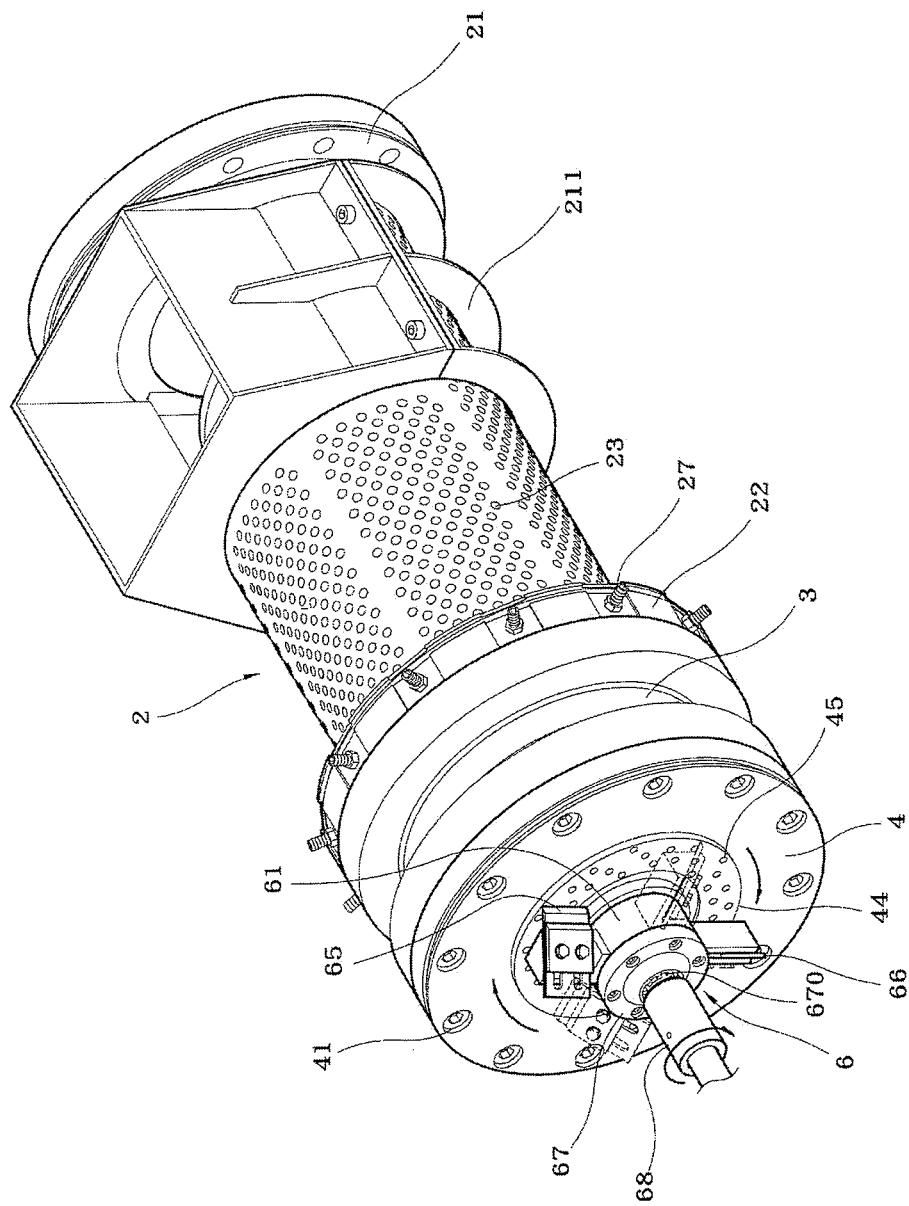
FIG. 2 is a partially perspective view of the recycling machine as shown in FIG. 1.
Figure 3:
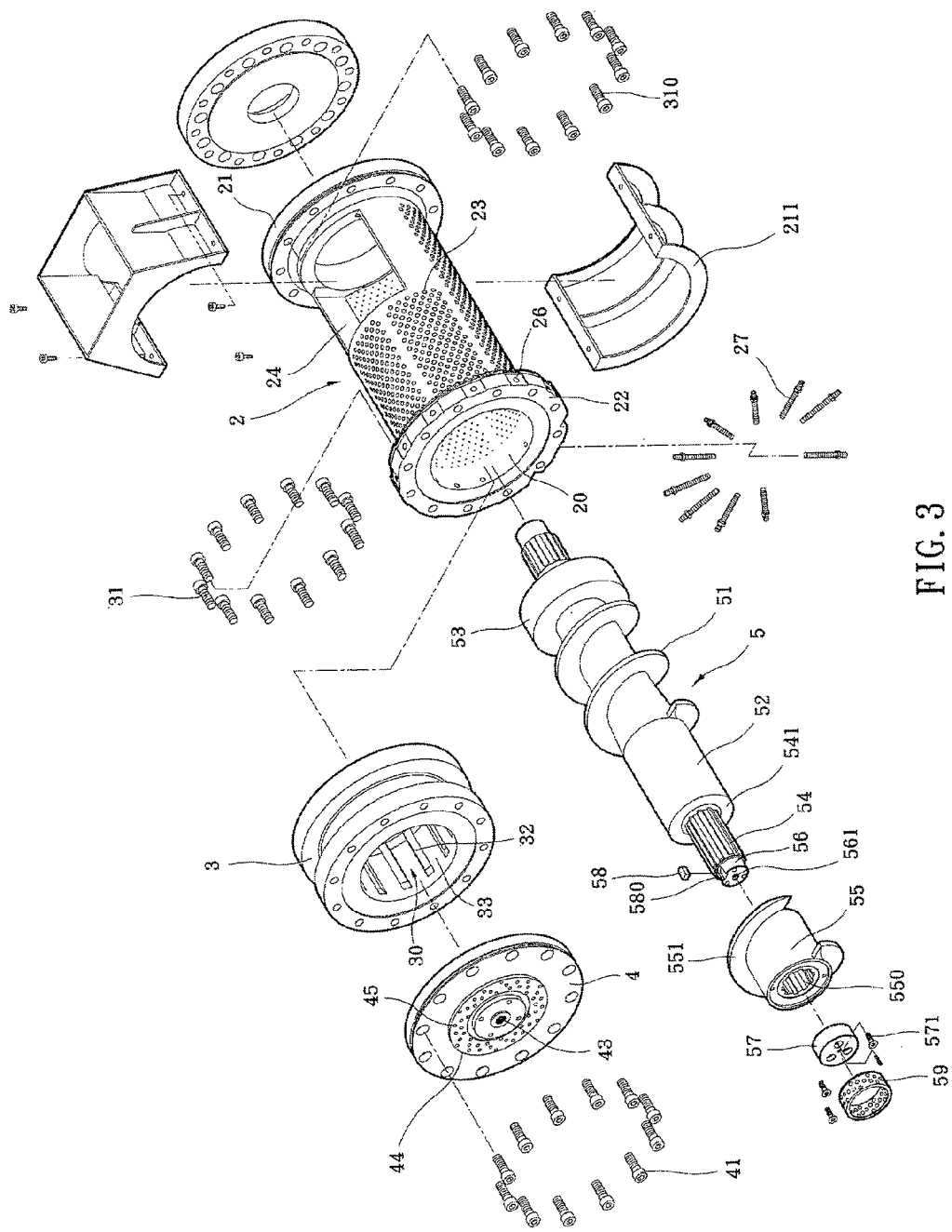
FIG. 3 is a partially exploded perspective view of the recycling machine as shown in FIG. 2.
Figure 4:
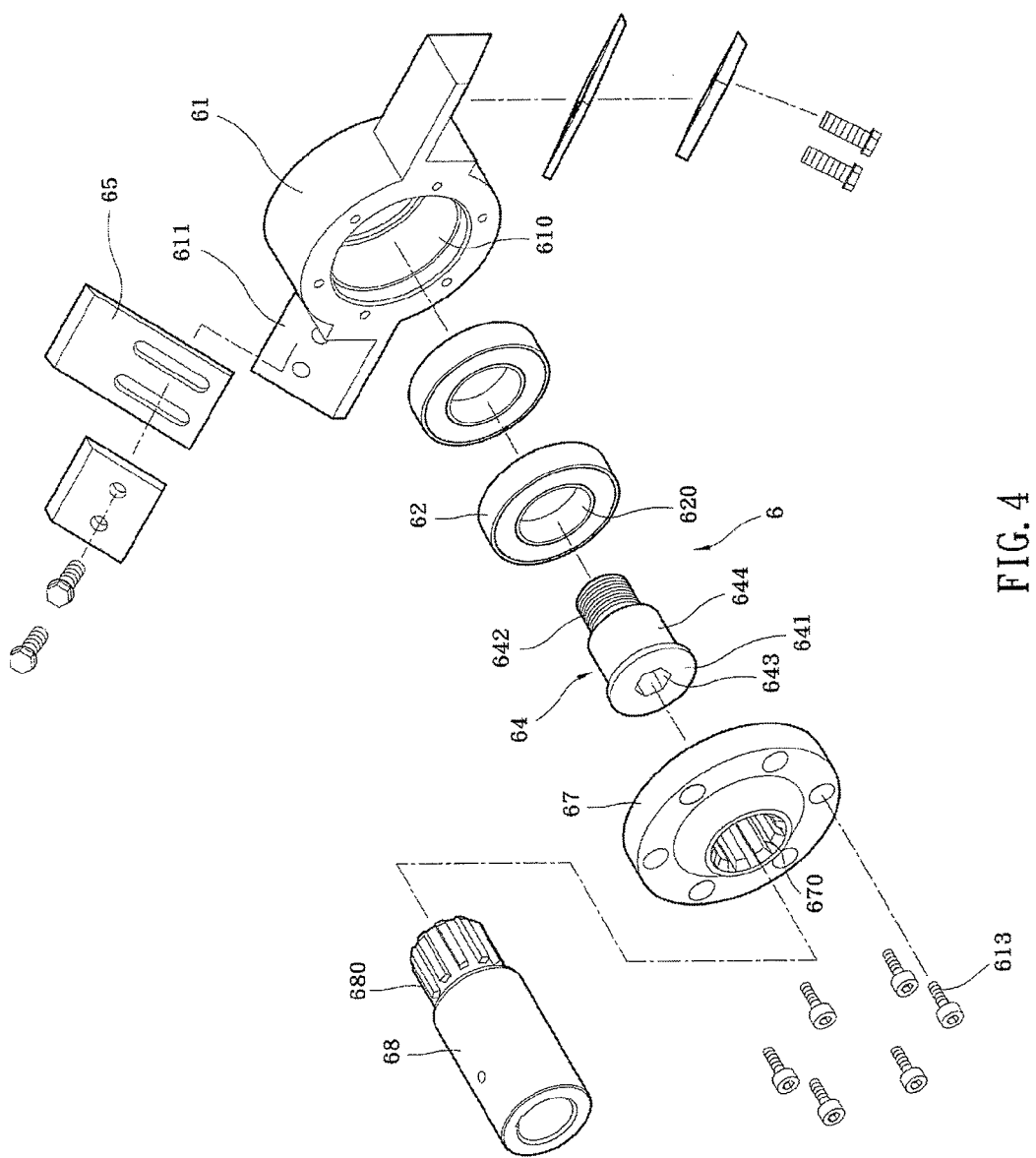
FIG. 4 is a partially exploded perspective view of the recycling machine as shown in FIG. 2.
Figure 5:
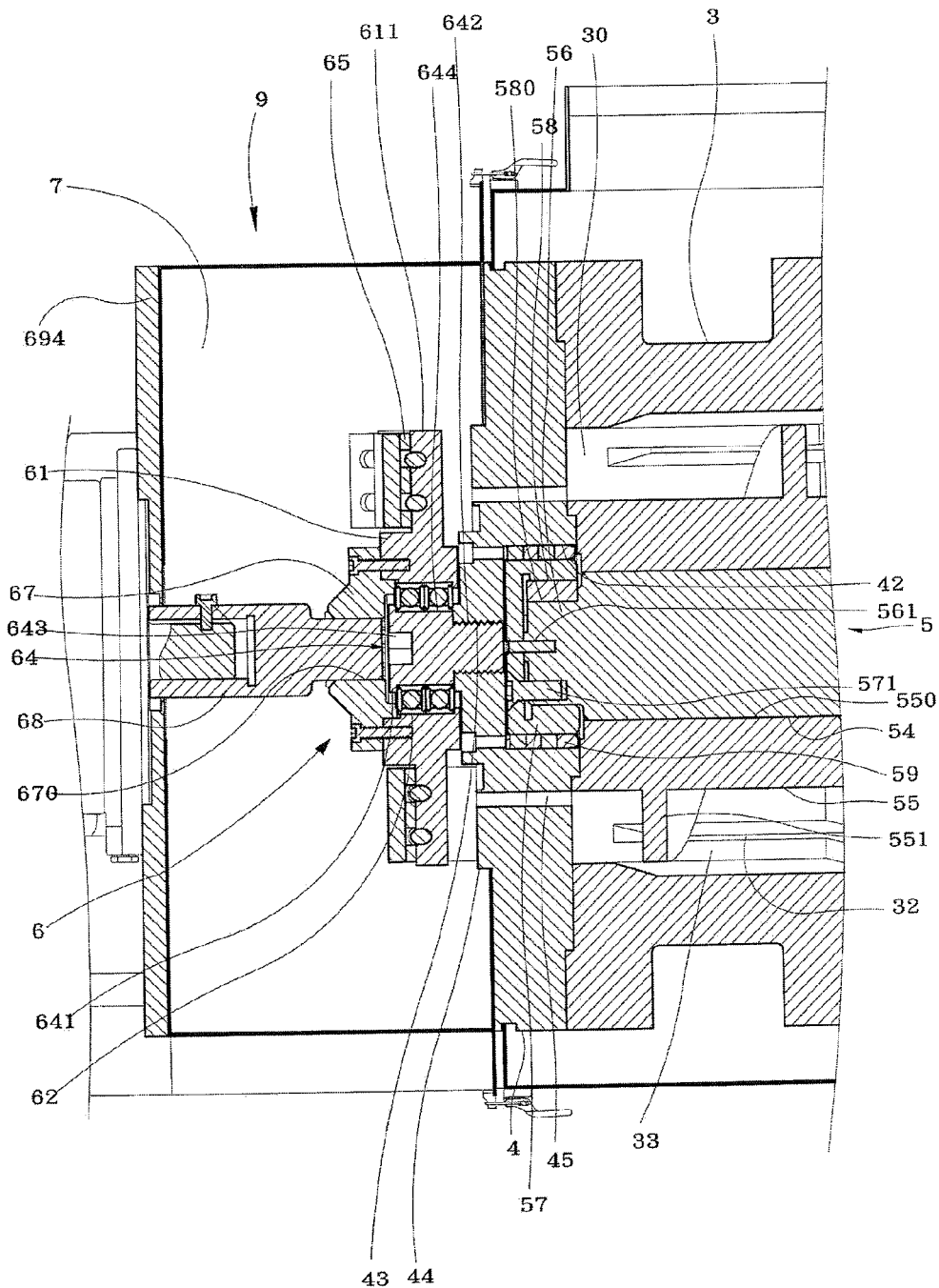
FIG. 5 is a locally enlarged view of the recycling machine as shown in FIG. 1.

Referring to the drawings and initially to FIGS. 1-5, a recycling machine in accordance with the preferred embodiment of the present invention comprises a main frame 1, a sieve barrel 2 mounted on the main frame 1, a plurality of spoilers 27 mounted on the sieve barrel 2, a pressing cylinder 3 connected with the sieve barrel 2, an end disk 4 mounted on the pressing cylinder 3, a propeller shaft 5 rotatably mounted in the sieve barrel 2 and the pressing cylinder 3, a cutting device 6 mounted on the end disk 4, and an output device 9 mounted on the end disk 4.

The main frame 1 has a top provided with a work table 11 for mounting a fixing base 12. The fixing base 12 of the main frame 1 has an inner portion provided with a tapered shaft hole 120 for mounting the propeller shaft 5. The recycling machine further comprises a transmission case 13 connected with the propeller shaft 5 to rotate the propeller shaft 5, and a main motor 14 connected with the transmission case 13 by a belt wheel unit 15 to drive the transmission case 13. The transmission case 13 has a gear set connected with the propeller shaft 5 by a coupler. Thus, the main motor 14 drives a gear set of the transmission case 13 by the belt wheel unit 15 so that the gear set of the transmission case 13 has an output power to rotate the propeller shaft 5.

The sieve barrel 2 has an inner wall provided with a receiving chamber 20 and has a surface provided with a plurality of sieving apertures 23 each connected to the receiving chamber 20. The sieve barrel 2 has a periphery provided with an inlet port 24 connected to the receiving chamber 20 for mounting a supply funnel 25 to supply reused materials into the receiving chamber 20. The sieve barrel 2 has a rim provided with a plurality of mounting bores 26 connected to the receiving chamber 20 for mounting the spoilers 27.

A support bracket 211 is fixed on the sieve barrel 2 and support on the work table 11 of the main frame 1 to support the sieve barrel 2 on the work table 11 of the main frame 1 in a transverse lying manner. A draining funnel 16 is mounted on the main frame 1 and located under the sieve barrel 2 to collect and drain wasted water or impurities that flow outward from the sieving apertures 23 of the sieve barrel 2.

The receiving chamber 20 of the sieve barrel 2 extends through a whole length of the sieve barrel 2 and has a first end located between the inlet port 24 of the sieve barrel 2 and the fixing base 12 of the main frame 1 and sealed by the fixing base 12 of the main frame 1 and a second end connected to the pressing cylinder 3. The sieving apertures 23 of the sieve barrel 2 are disposed between the inlet port 24 of the sieve barrel 2 and the pressing cylinder 3. The sieve barrel 2 has a first end provided with a first locking ring 22 connected with the pressing cylinder 3 by a plurality of first locking bolts 31 and a second end provided with a second locking ring 21 connected with the fixing base 12 of the main frame 1 by a plurality of second locking bolts 310.

Each of the spoilers 27 is extended into the receiving chamber 20 of the sieve barrel 2 and is located between the sieve barrel 2 and the pressing cylinder 3.

The pressing cylinder 3 is located between the sieve barrel 2 and the end disk 4 and has an inner wall provided with a receiving space 30 connected to and concentric with the receiving chamber 20 of the sieve barrel 2. The receiving space 30 of the pressing cylinder 3 extends through a whole length of the pressing cylinder 3 and has a first end connected to the receiving chamber 20 of the sieve barrel 2 and a second end sealed by the end disk 4. The receiving space 30 of the pressing cylinder 3 has a periphery provided with a plurality of toothed pressing portions 33. The receiving space 30 of the pressing cylinder 3 has a diameter flush with that of the receiving chamber 20 of the sieve barrel 2.

The end disk 4 is locked onto the pressing cylinder 3 by a plurality of fastening bolts 41 and is located between the pressing cylinder 3 and the cutting device 6 to seal the receiving space 30 at the second end of the pressing cylinder 3. The end disk 4 is provided with a plurality of extruding holes 45 each connected to the receiving space 30 of the pressing cylinder 3. Each of the extruding holes 45 of the end disk 4 is arranged in an axial direction of the receiving space 30 of the pressing cylinder 3. The end disk 4 has a side provided with a receiving hole 42 which is concentric with the receiving space 30 of the pressing cylinder 3. The end disk 4 has a central portion provided with a screw hole 43 which is concentric with the receiving space 30 of the pressing cylinder 3.

The end disk 4 has a surface provided with an annular zone 44 which is concentric with the receiving space 30 of the pressing cylinder 3. The annular zone 44 of the end disk 4 has an outer diameter smaller than a diameter of the receiving space 30 of the pressing cylinder 3 and has an inner diameter greater than a diameter of the receiving hole 42 of the end disk 4. The extruding holes 45 of the end disk 4 are formed in the annular zone 44. The extruding holes 45 of the end disk 4 are extended from an inner portion to an outer portion of the annular zone 44 and are arranged in an arc-shaped manner.

The propeller shaft 5 is received in and concentric with the receiving chamber 20 of the sieve barrel 2 and the receiving space 30 of the pressing cylinder 3 and is rotatable to force the reused materials from the sieve barrel 2 toward the pressing cylinder 3. The propeller shaft 5 is provided with a first helical blade 51 disposed in the sieve barrel 2, and a buffering portion 52 disposed in the sieve barrel 2, and the recycling machine further comprises a second helical blade 551 mounted on the propeller shaft 5 and disposed in the pressing cylinder 3. The first helical blade 51 of the propeller shaft 5 traverses the inlet port 24 of the sieve barrel 2. The buffering portion 52 of the propeller shaft 5 is located between the first helical blade 51 and the second helical blade 551 and has a diameter smaller that of the first helical blade 51 and smaller that of the second helical blade 551. The second helical blade 551 aligns with the toothed pressing portions 33 of the pressing cylinder 3 and has a rotation direction the same as that of the first helical blade 51. The propeller shaft 5 is further provided with an annular shoulder 53 rotatably mounted in the receiving chamber 20 of the sieve barrel 2 and located between the inlet port 24 of the sieve barrel 2 and the fixing base 12 of the main frame 1 to prevent the reused materials from being jammed or choked at the right side of the inlet port 24 of the sieve barrel 2.

In the preferred embodiment of the present invention, the periphery of the receiving space 30 of the pressing cylinder 3 is provided with a plurality of elongate slots 32, and the toothed pressing portions 33 of the pressing cylinder 3 are defined between the elongate slots 32. The elongate slots 32 of the pressing cylinder 3 are extended in an axial direction of the pressing cylinder 3.

The second helical blade 551 is formed on and protruded from a jacket 55 which is removably mounted on the propeller shaft 5, and the recycling machine further comprises a retainer 57 locked onto the propeller shaft 5 and abutting the jacket 55 to limit the jacket 55 on the propeller shaft 5, and a collar 59 mounted on the retainer 57 and rotatably mounted in the end disk 4.

The propeller shaft 5 has a first end rotatably mounted on the receiving hole 42 of the end disk 4 and provided with a splined spindle 54 disposed in the pressing cylinder 3 for mounting the jacket 55. The propeller shaft 5 has a second end rotatably mounted in the shaft hole 120 of the fixing base 12. The splined spindle 54 of the propeller shaft 5 has a diameter smaller than that of the buffering portion 52 of the propeller shaft 5, and the propeller shaft 5 has a stepped stop portion 541 defined between the splined spindle 54 and the buffering portion 52. Thus, the jacket 55 is mounted on the splined spindle 54 of the propeller shaft 5 and is located between the stop portion 541 of the propeller shaft 5 and the retainer 57.

The jacket 55 has an inner wall provided with a splined hole 550 mounted on the splined spindle 54 of the propeller shaft 5 so that the jacket 55 is rotatable in concert with the propeller shaft 5. The jacket 55 has an outer wall provided with the second helical blade 551. The collar 59 is rotatably mounted in the receiving hole 42 of the end disk 4.

The splined spindle 54 of the propeller shaft 5 has a distal end provided with a mounting portion 56 for mounting the retainer 57. The mounting portion 56 of the propeller shaft 5 has a diameter smaller than that of the splined spindle 54 and has a periphery provided with a keyway 580 for receiving a key 58 which is located between the mounting portion 56 of the propeller shaft 5 and the retainer 57. The mounting portion 56 of the propeller shaft 5 has an end face provided with a plurality of screw bores 561, and the recycling machine further comprises a plurality of locking screws 571 extended through the retainer 57 and screwed into the screw bores 561 of the propeller shaft 5 to lock the retainer 57 onto the mounting portion 56 of the propeller shaft 5. Thus, when the retainer 57 is detached from the mounting portion 56 of the propeller shaft 5, the jacket 55 can be removed from the splined spindle 54 of the propeller shaft 5 to facilitate maintenance or replacement of the second helical blade 551.

The cutting device 6 is aligned with the extruding holes 45 of the end disk 4 and is rotatable relative to the end disk 4 to cut the reused materials that are extruded outward from the extruding holes 45 of the end disk 4. The cutting device 6 includes a rotation seat 61 rotatably mounted on the end disk 4 by a support bolt 64 and having a periphery provided with two opposite mounting brackets 611, two cutting blades 65 each mounted on a respective one of the two mounting brackets 611 and each movable to pass by the extruding holes 45 of the end disk 4 to cut the reused materials that are extruded outward from the extruding holes 45 of the end disk 4, two bearings 62 each mounted between the rotation seat 61 and the support bolt 64, a drive member 67 connected with the rotation seat 61 to rotate the rotation seat 61 about the support bolt 64, a transmission shaft 68 connected with the drive member 67 to rotate the drive member 67, and an actuator 69 connected with the transmission shaft 68 to rotate the transmission shaft 68.

The rotation seat 61 of the cutting device 6 is coaxial with the screw hole 43 of the end disk 4 and has a central portion provided with a stepped bearing hole 610 for mounting the bearings 62. The cutting blades 65 of the cutting device 6 are movable on the annular zone 44 of the end disk 4. The support bolt 64 of the cutting device 6 is extended through the bearings 62 and the bearing hole 610 of the rotation seat 61 and is provided with an external thread 642 screwed into the screw hole 43 of the end disk 4. The support bolt 64 of the cutting device 6 has a first end provided with an enlarged head 641 abutting one of the bearings 62, a mediate portion provided with a stub 644 extending through the bearings 62 and a second end provided with the external thread 642. The enlarged head 641 of the support bolt 64 has an end face provided with a hexagonal tool hole 643 to allow insertion of a hand tool, such as a hex wrench and the like. The bearings 62 of the cutting device 6 are located between the enlarged head 641 of the support bolt 64 and the bearing hole 610 of the rotation seat 61. Each of the bearings 62 has an inner wall provided with a mounting hole 620 mounted on the stub 644 of the support bolt 64. The drive member 67 of the cutting device 6 has a central portion provided with a driven hole 670 which is coaxial with the support bolt 64. The transmission shaft 68 of the cutting device 6 has a first end provided with a drive portion 680 inserted into and engaged with the driven hole 670 of the drive member 67 to drive the drive member 67 and a second end connected with and driven by the actuator 69.

The actuator 69 of the cutting device 6 includes a gear box 692 connected with the transmission shaft 68 to drive the transmission shaft 68, a drive motor 691 connected with the gear box 692 to drive the gear box 692, and a linear driver 693 connected with the drive motor 691 and the gear box 692 to move the drive motor 691 and the gear box 692 linearly. The gear box 692 of the actuator 69 can adjust the rotation speed of the rotation seat 61.

The output device 9 includes a collector 7 connected to the extruding holes 45 of the end disk 4 to gather and store the reused materials that are extruded outward from the extruding holes 45 of the end disk 4 and are cut by the cutting blades 65 of the cutting device 6. The collector 7 of the output device 9 has an inner space covering the extruding holes 45 of the end disk 4, the rotation seat 61 and the drive member 67. The collector 7 of the output device 9 is attached to a front plate 694 of the actuator 69. The front plate 694 of the actuator 69 is driven by the linear driver 693 of the actuator 69 so that the collector 7 of the output device 9 is driven by the linear driver 693 of the actuator 69 to move linearly relative to the end disk 4 to facilitate an operator cleaning or repairing the collector 7 of the output device 9. The transmission shaft 68 of the cutting device 6 is extended through the collector 7 of the output device 9 to connect the actuator 69.

In operation, still referring to FIGS. 1-5, when the propeller shaft 5 is rotated by operation of the main motor 14 and the transmission case 13, the first helical blade 51 is rotated to force the reused materials from the inlet port 24 into the receiving chamber 20 of the sieve barrel 2 to proceed a first-stage dehydration process. At this time, the draining funnel 16 is used to collect and drain wasted water or impurities that flow outward from the sieving apertures 23 of the sieve barrel 2. Then, the reused materials are delivered through a buffering space formed between the buffering portion 52 of the propeller shaft 5 and the receiving chamber 20 of the sieve barrel 2 and are dehydrated completely. Then, the reused materials are delivered through the receiving chamber 20 of the sieve barrel 2 into the receiving space 30 of the pressing cylinder 3. At this time, the reused materials are stopped and divided by the spoilers 27, and the travel direction of the reused materials is changed by delivery of the second helical blade 551 so that the reused materials will not be choked during movement. Then, the reused materials are forced into the receiving space 30 of the pressing cylinder 3 by rotation of the second helical blade 551 and are pressed by the toothed pressing portions 33 of the pressing cylinder 3 so that the reused materials are combined to have a compact structure. Then, the reused materials are extruded outward from the extruding holes 45 of the end disk 4 by rotation of the second helical blade 551 so that the reused materials are squeezed to have a strip shape. Then, the reused materials are cut by the cutting device 6 so that the reused materials are trimmed to have a particle, bar or strip shape with a predetermined length.

Then, the reused materials are gathered and stored by the collector 7 of the output device 9 and are delivered outward from the collector 7 of the output device 9.

Accordingly, the reused materials are forced into and revolved in the sieve barrel 2 by rotation of the first helical blade 51 to proceed a first-stage dehydration process, and are compressed in the buffering space between the buffering portion 52 of the propeller shaft 5 and the receiving chamber 20 of the sieve barrel 2 to proceed a second-stage dehydration process so that the reused materials are dehydrated completely. In addition, the travel direction of the reused materials is changed by actions of the spoilers 27 and the second helical blade 551 so that the reused materials will not be choked or jammed during movement. Further, when the reused materials are delivered into the pressing cylinder 3, the reused materials are pressed by the toothed pressing portions 33 and are drawn by the second helical blade 551 so that the reused materials are pressed and kneaded in the pressing cylinder 3 smoothly and evenly to enhance the quality of the reused materials. Further, the reused materials are forced into the pressing cylinder 3 by rotation of the second helical blade 551 and are pressed by the toothed pressing portions 33 so that the reused materials are compressed and rolled to have a compact structure. Further, the reused materials are cut by the cutting device 6 to have a particle, bar or strip shape with a predetermined length to enhance the working time and efficiency.

Figure 6:
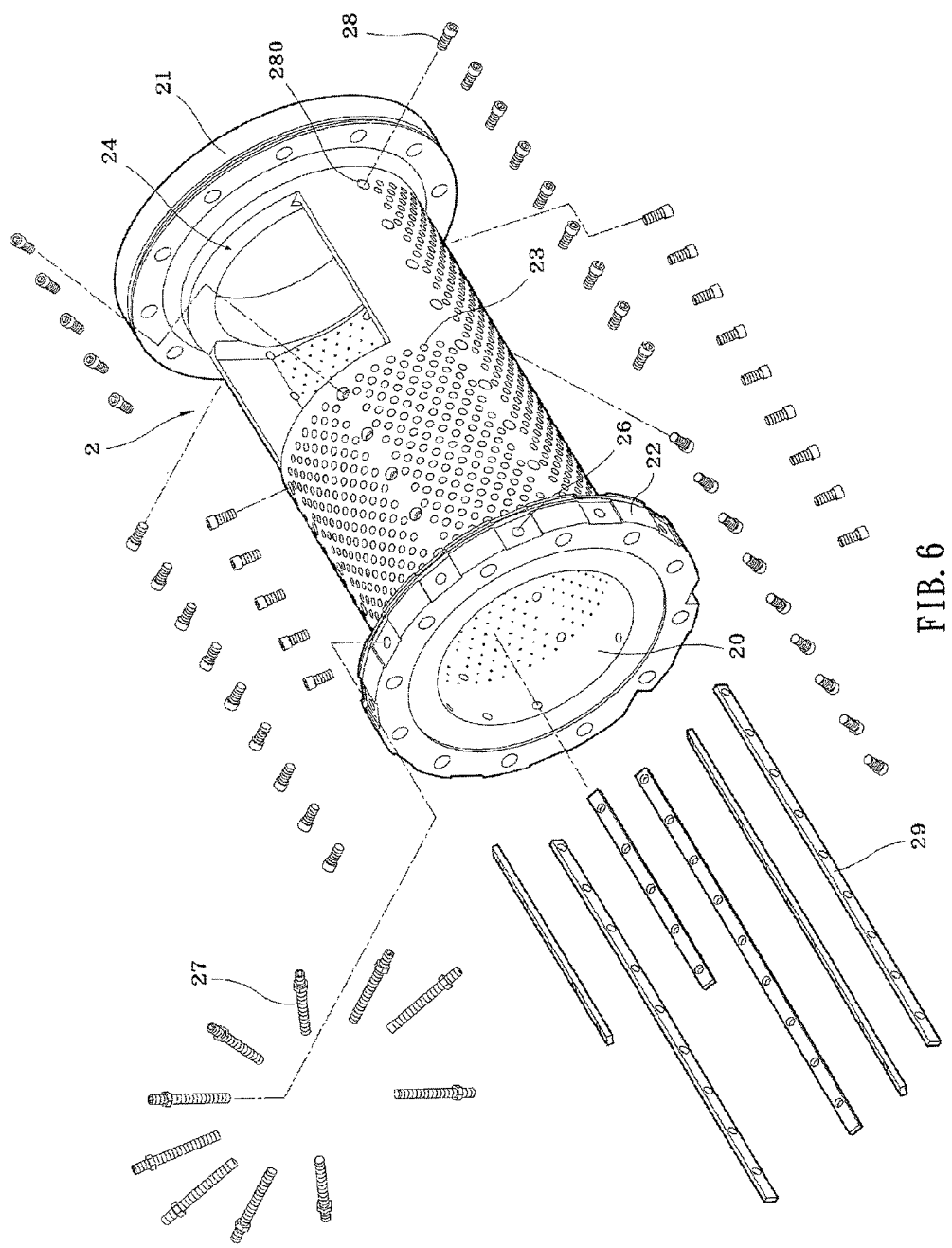
FIG. 6 is a partially exploded perspective view of a recycling machine in accordance with another preferred embodiment of the present invention.

Referring to FIG. 6, the recycling machine further comprises a plurality of spoiler bars 29 mounted in the receiving chamber 20 of the sieve barrel 2 and extended in an axial direction of the sieve barrel 2 to successively change the travel direction of the reused materials in the receiving chamber 20 of the sieve barrel 2. The sieve barrel 2 has a peripheral wall provided with a plurality of locking holes 280, and the spoiler bars 29 are locked in the receiving chamber 20 of the sieve barrel 2 by a plurality of locking bolts 28 which are extended through the locking holes 280 of the sieve barrel 2 and are screwed into the spoiler bars 29.

Figure 7:
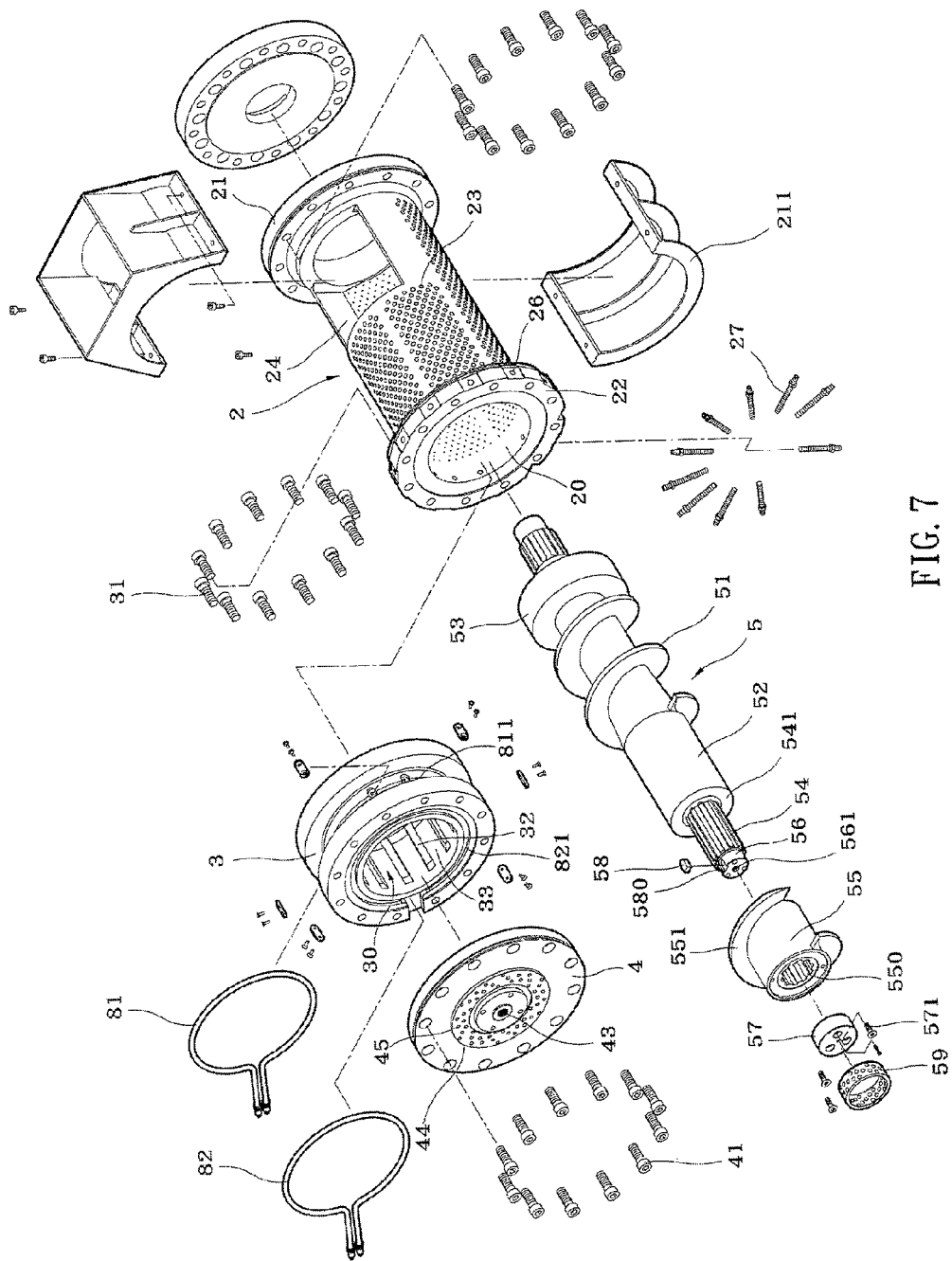
FIG. 7 is a partially exploded perspective view of a recycling machine in accordance with another preferred embodiment of the present invention.
Figure 8:
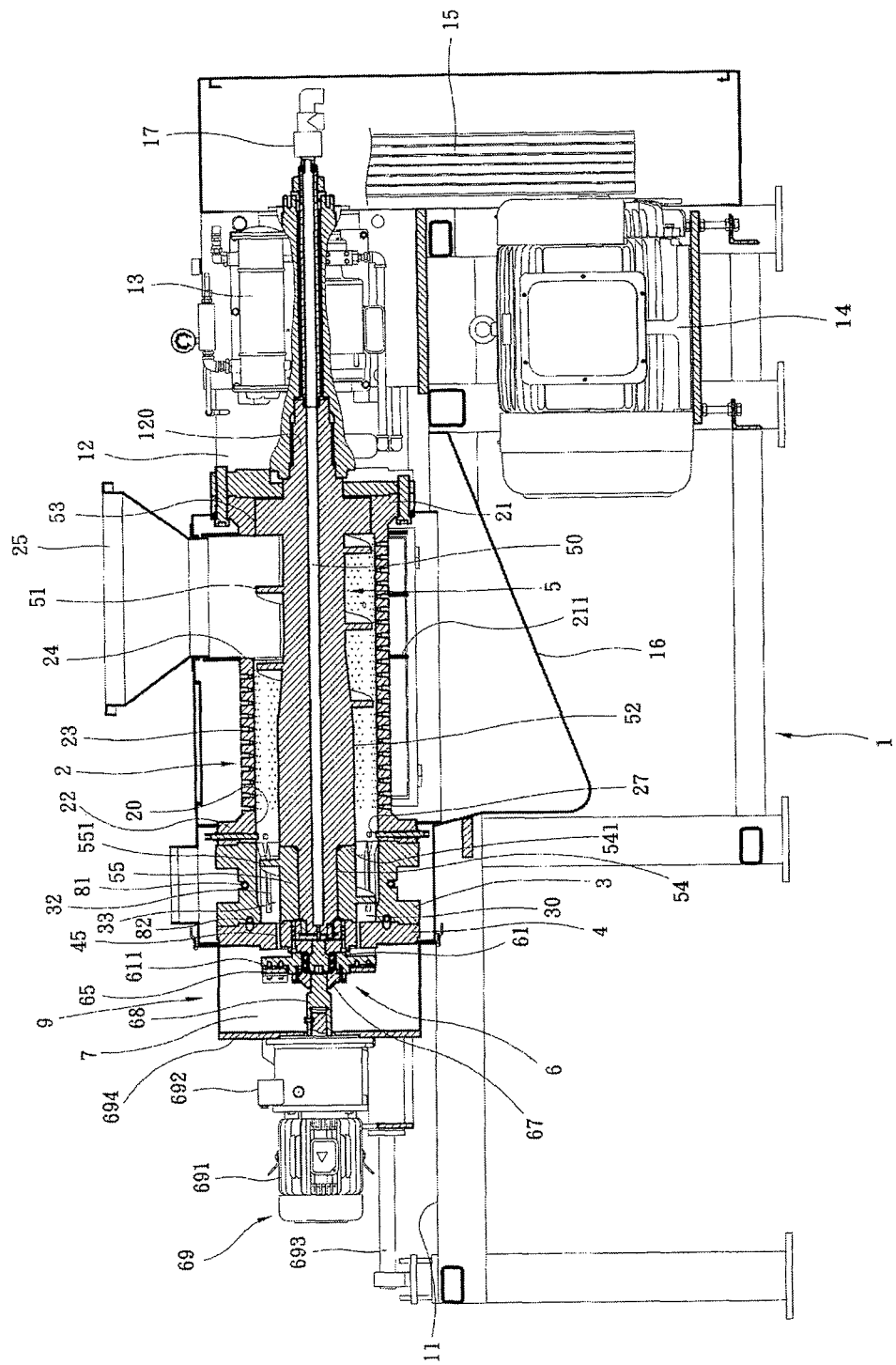
FIG. 8 is a front cross-sectional view of a recycling machine in accordance with another preferred embodiment of the present invention.

Referring to FIGS. 7 and 8, the recycling machine further comprises two heat exchange lines 81 and 82 mounted on the pressing cylinder 3 to regulate and control the working temperature of the pressing cylinder 3 so that the reused materials are kneaded in the pressing cylinder 3 smoothly and stably. The pressing cylinder 3 has an outer wall provided with a receiving groove 811 for mounting one of the two heat exchange lines 81 and 82, and has an end face provided with a mounting groove 821 for mounting the other one of the two heat exchange lines 81 and 82. The mounting groove 821 of the pressing cylinder 3 is located between the pressing cylinder 3 and the end disk 4. The propeller shaft 5 has a central portion provided with a central hole 50 to reduce the weight of the propeller shaft 5 and to provide a heatsink effect to the propeller shaft 5. The central hole 50 of the propeller shaft 5 has an end connected to a conduit 17.

Figure 9:
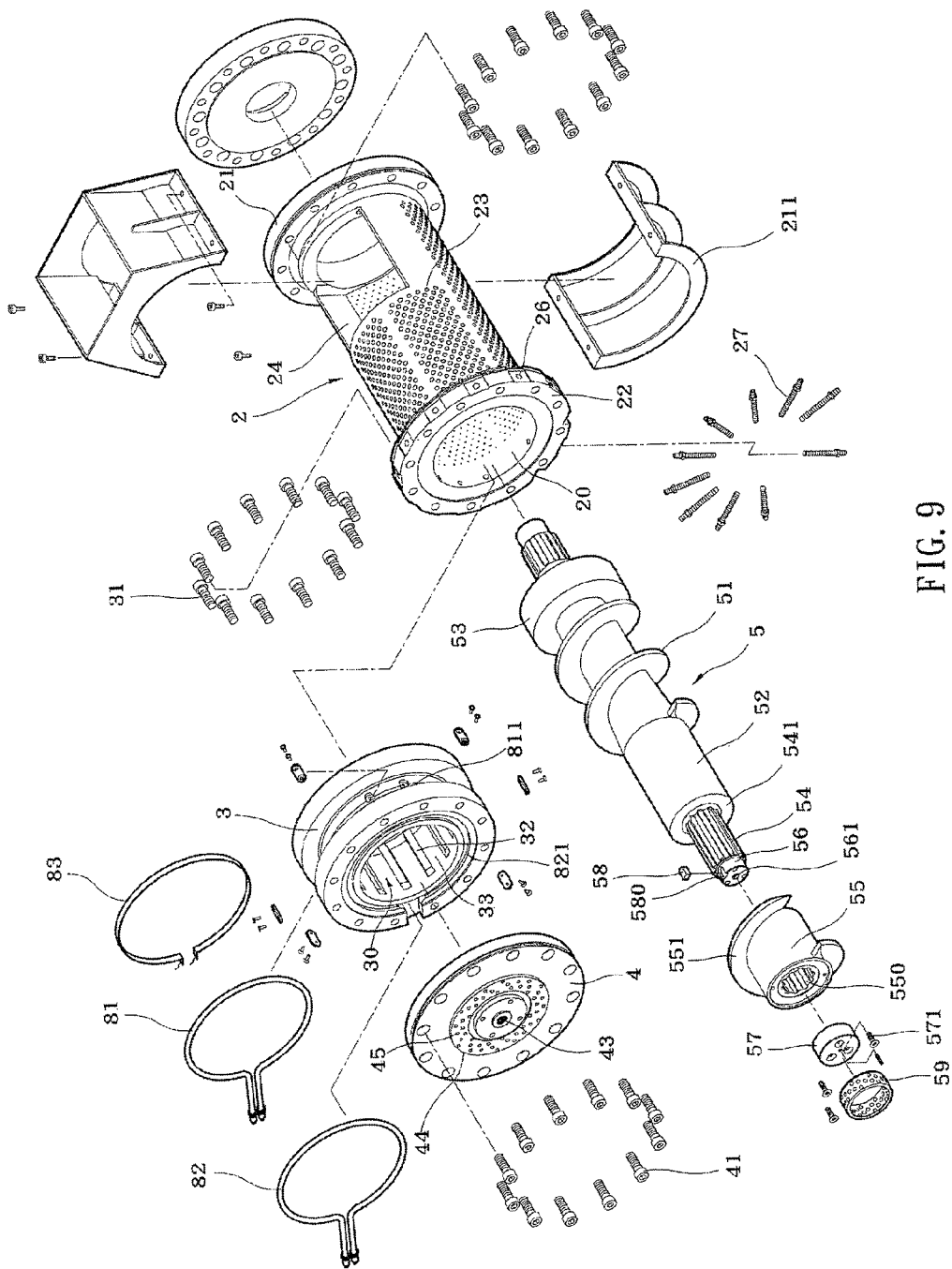
FIG. 9 is a partially exploded perspective view of a recycling machine in accordance with another preferred embodiment of the present invention.

Referring to FIG. 9, the recycling machine further comprises a heating element 83 mounted on the pressing cylinder 3 to preheat the pressing cylinder 3.

Figure 10:
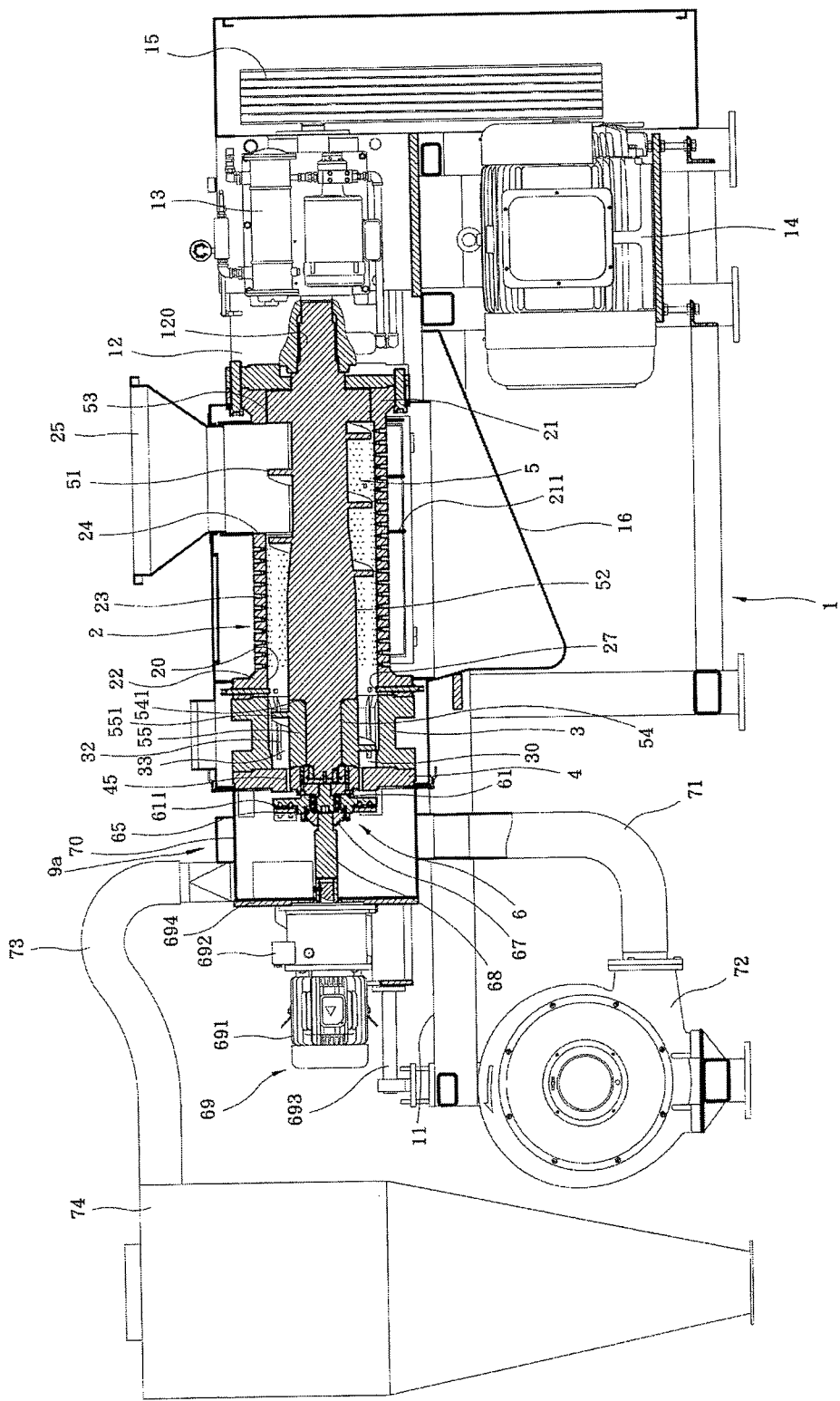
FIG. 10 is a front cross-sectional view of a recycling machine in accordance with another preferred embodiment of the present invention.

Referring to FIG. 10, the output device 9a includes a guide box 70 connected to the extruding holes 45 of the end disk 4, an air pipe 71 connected with the guide box 70, an air blower 72 connected with the air pipe 71, an output pipe 73 connected with the guide box 70, and a collecting hopper 74 connected with the output pipe 73. Thus, the air blower 72 introduces an air current into the guide box 70 to force the reused materials through the output pipe 73 into the collecting hopper 74 so that the reused materials are gathered in the collecting hopper 74 automatically. The guide box 70 of the output device 9a has an inner space covering the extruding holes 45 of the end disk 4, the rotation seat 61 and the drive member 67. The guide box 70 of the output device 9a is attached to a front plate 694 of the actuator 69. The front plate 694 of the actuator 69 is driven by the linear driver 693 of the actuator 69 so that the guide box 70 of the output device 9a is driven by the linear driver 693 of the actuator 69 to move linearly relative to the end disk 4 to facilitate an operator cleaning or repairing the collector 7 of the output device 9. The transmission shaft 68 of the cutting device 6 is extended through the guide box 70 of the output device 9a to connect the actuator 69.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:
1. A recycling machine, comprising:
a main frame;
a sieve barrel mounted on the main frame;
a pressing cylinder connected with the sieve barrel;
an end disk mounted on the pressing cylinder and providing an extruding function;
a propeller shaft rotatably mounted in the sieve barrel and the pressing cylinder;
a cutting device mounted on the end disk; and
an output device mounted on the end disk;
wherein the sieve barrel has an inner wall provided with a receiving chamber and has a surface provided with a plurality of sieving apertures each connected to the receiving chamber;
the sieve barrel has a periphery provided with an inlet port connected to the receiving chamber;
the pressing cylinder has an inner wall provided with a receiving space connected to the receiving chamber of the sieve barrel;
the receiving space of the pressing cylinder has a periphery provided with a plurality of toothed pressing portions;
the receiving space of the pressing cylinder has a first end connected to the receiving chamber of the sieve barrel and a second end connected to the end disk;
the second end of the receiving space of the pressing cylinder is sealed by the end disk;
the end disk is provided with a plurality of extruding holes each connected to the receiving space of the pressing cylinder;
the propeller shaft is received in the receiving chamber of the sieve barrel and the receiving space of the pressing cylinder;
the propeller shaft is provided with a first helical blade disposed in the sieve barrel, and a buffering portion disposed in the sieve barrel;
the recycling machine further comprises a second helical blade mounted on the propeller shaft and disposed in the pressing cylinder;
the buffering portion of the propeller shaft is located between the first helical blade and the second helical blade;
the cutting device is aligned with the extruding holes of the end disk;
the recycling machine further comprises a plurality of spoilers mounted on the sieve barrel;
each of the spoilers is partially extended into the receiving chamber of the sieve barrel.

2. The recycling machine of claim 1, wherein
the pressing cylinder has a cylindrical shape;
the receiving space of the pressing cylinder has a circular shape;
the receiving space of the pressing cylinder extends through a whole length of the pressing cylinder;
each of the extruding holes of the end disk is arranged in an axial direction of the receiving space of the pressing cylinder.

3. The recycling machine of claim 1, wherein
the buffering portion of the propeller shaft has a diameter smaller that of the first helical blade and smaller that of the second helical blade;
the second helical blade aligns with the toothed pressing portions of the pressing cylinder and has a rotation direction the same as that of the first helical blade.

4. The recycling machine of claim 1, wherein
the periphery of the receiving space of the pressing cylinder is provided with a plurality of elongate slots;
the toothed pressing portions of the pressing cylinder are defined between the elongate slots;
the elongate slots of the pressing cylinder are extended in an axial direction of the pressing cylinder.

5. The recycling machine of claim 1, wherein
the second helical blade is formed on and protruded from a jacket which is removably mounted on the propeller shaft;
the jacket has a cylindrical shape;
the recycling machine further comprises:
a retainer locked onto the propeller shaft and abutting the jacket to limit the jacket on the propeller shaft;
a collar mounted on the retainer and rotatably mounted in the end disk;
the end disk has a side provided with a receiving hole which is concentric with the receiving space of the pressing cylinder;
the propeller shaft has a first end rotatably mounted on the receiving hole of the end disk and provided with a splined spindle disposed in the pressing cylinder for mounting the jacket;
the jacket has an inner wall provided with a splined hole mounted on the splined spindle of the propeller shaft so that the jacket is rotatable in concert with the propeller shaft;
the jacket has an outer wall provided with the second helical blade;
the splined spindle of the propeller shaft has a distal end provided with a mounting portion for mounting the retainer;
the collar is rotatably mounted in the receiving hole of the end disk.

6. The recycling machine of claim 5, wherein
the splined spindle of the propeller shaft has a diameter smaller than that of the buffering portion of the propeller shaft;
the propeller shaft has a stepped stop portion defined between the splined spindle and the buffering portion;
the jacket is mounted on the splined spindle of the propeller shaft and is located between the stop portion of the propeller shaft and the retainer.

7. The recycling machine of claim 5, wherein the mounting portion of the propeller shaft has a diameter smaller than that of the splined spindle and has a periphery provided with a keyway for receiving a key which is located between the mounting portion of the propeller shaft and the retainer.

8. The recycling machine of claim 5, wherein
the mounting portion of the propeller shaft has an end face provided with a plurality of screw bores;
the recycling machine further comprises a plurality of locking screws extended through the retainer and screwed into the screw bores of the propeller shaft to lock the retainer onto the mounting portion of the propeller shaft.

9. The recycling machine of claim 1, wherein the cutting device includes:
a rotation seat rotatably mounted on the end disk by a support bolt and having a periphery provided with two opposite mounting brackets;
two cutting blades each mounted on a respective one of the two mounting brackets and each movable to pass by the extruding holes of the end disk;
two bearings each mounted between the rotation seat and the support bolt;
a drive member connected with the rotation seat to rotate the rotation seat about the support bolt;
a transmission shaft connected with the drive member to rotate the drive member;
an actuator connected with the transmission shaft to rotate the transmission shaft.

10. The recycling machine of claim 9, wherein
the end disk has a central portion provided with a screw hole which is concentric with the receiving space of the pressing cylinder;
the end disk has a surface provided with an annular zone which is concentric with the receiving space of the pressing cylinder;
the annular zone of the end disk surrounds the screw hole;
the annular zone of the end disk has an outer diameter smaller than a diameter of the receiving space of the pressing cylinder;
the extruding holes of the end disk are formed in the annular zone;
the extruding holes of the end disk are extended from an inner portion to an outer portion of the annular zone and are arranged in an arc-shaped manner;
the rotation seat of the cutting device is coaxial with the screw hole of the end disk and has a central portion provided with a bearing hole for mounting the bearings;
the cutting blades of the cutting device are movable on the annular zone of the end disk;
the support bolt of the cutting device is extended through the bearings and the bearing hole of the rotation seat and is provided with an external thread screwed into the screw hole of the end disk;
the drive member of the cutting device has a central portion provided with a driven hole which is coaxial with the support bolt;
the transmission shaft of the cutting device has a first end provided with a drive portion inserted into and engaged with the driven hole of the drive member to drive the drive member and a second end connected with and driven by the actuator;
the actuator of the cutting device includes:
a gear box connected with the transmission shaft to drive the transmission shaft;
a drive motor connected with the gear box to drive the gear box;
a linear driver connected with the drive motor and the gear box to move the drive motor and the gear box linearly.

11. The recycling machine of claim 5, wherein
the main frame has a top provided with a fixing base;
the fixing base of the main frame has an inner portion provided with a shaft hole for mounting the propeller shaft;
the propeller shaft has a second end rotatably mounted in the shaft hole of the fixing base;
the receiving chamber of the sieve barrel extends through a whole length of the sieve barrel and has a first end located between the inlet port of the sieve barrel and the fixing base of the main frame and sealed by the fixing base of the main frame and a second end connected to the pressing cylinder;
the recycling machine further comprises:
a transmission case connected with the propeller shaft to rotate the propeller shaft;
a main motor connected with the transmission case to drive the transmission case;
the first helical blade of the propeller shaft traverses the inlet port of the sieve barrel;
the propeller shaft is further provided with an annular shoulder rotatably mounted in the receiving chamber of the sieve barrel and located between the inlet port of the sieve barrel and the fixing base of the main frame.

12. The recycling machine of claim 1, wherein the recycling machine further comprises a plurality of spoiler bars mounted in the receiving chamber of the sieve barrel and extended in an axial direction of the sieve barrel.

13. The recycling machine of claim 1, wherein the recycling machine further comprises two heat exchange lines mounted on the pressing cylinder.

14. The recycling machine of claim 13, wherein
the pressing cylinder has an outer wall provided with a receiving groove for mounting one of the two heat exchange lines, and has an end face provided with a mounting groove for mounting the other one of the two heat exchange lines;
the mounting groove of the pressing cylinder is located between the pressing cylinder and the end disk.

15. The recycling machine of claim 1, wherein the recycling machine further comprises a heating element mounted on the pressing cylinder to preheat the pressing cylinder.

16. The recycling machine of claim 1, wherein the propeller shaft has a central portion provided with a central hole.

17. The recycling machine of claim 9, wherein
the output device includes a collector connected to the extruding holes of the end disk;
the collector of the output device has an inner space covering the extruding holes of the end disk, the rotation seat and the drive member.

18. The recycling machine of claim 1, wherein the output device includes:
a guide box connected to the extruding holes of the end disk;
an air pipe connected with the guide box;
an air blower connected with the air pipe;
an output pipe connected with the guide box;
a collecting hopper connected with the output pipe.

19. The recycling machine of claim 1, wherein
the sieving apertures of the sieve barrel are disposed between the inlet port of the sieve barrel and the pressing cylinder;
each of the spoilers is located between the sieve barrel and the pressing cylinder;
the pressing cylinder is located between the sieve barrel and the end disk;
the receiving space of the pressing cylinder has a diameter flush with that of the receiving chamber of the sieve barrel;
the end disk is located between the pressing cylinder and the cutting device to seal the receiving space at the second end of the pressing cylinder.

\* \* \* \* \*